US008224556B2

(12) United States Patent
Burkhardt et al.

(10) Patent No.: US 8,224,556 B2
(45) Date of Patent: Jul. 17, 2012

(54) METHOD AND DEVICE FOR OPERATING AN INTERNAL COMBUSTION ENGINE

(75) Inventors: Thomas Burkhardt, Neutraubling (DE); Jürgen Dingl, Regensburg (DE); Andreas Pflüger, Hofheim Diedenbergen (DE)

(73) Assignee: Continental Automotive GmbH, Hannover (DE)

( * ) Notice: Subject to any disclaimer, the term of this patent is extended or adjusted under 35 U.S.C. 154(b) by 62 days.

(21) Appl. No.: 12/919,188

(22) PCT Filed: Feb. 5, 2009

(86) PCT No.: PCT/EP2009/051304
§ 371 (c)(1),
(2), (4) Date: Dec. 1, 2010

(87) PCT Pub. No.: WO2009/112313
PCT Pub. Date: Sep. 17, 2009

(65) Prior Publication Data
US 2011/0071749 A1    Mar. 24, 2011

(30) Foreign Application Priority Data
Mar. 13, 2008    (DE) .......................... 10 2008 014 069

(51) Int. Cl.
*F02D 41/26* (2006.01)
*F02B 47/08* (2006.01)
(52) U.S. Cl. .................................. 701/108; 123/568.21
(58) Field of Classification Search .......... 701/107–108; 123/568.11, 568.16, 568.21
See application file for complete search history.

(56) References Cited

U.S. PATENT DOCUMENTS

| | | | |
|---|---|---|---|
| 5,549,080 A | 8/1996 | Uchikawa | 123/90.16 |
| 5,889,205 A | 3/1999 | Treinies et al. | |
| 5,974,870 A | 11/1999 | Treinies et al. | 73/118.2 |
| 5,979,378 A | 11/1999 | Matsuno et al. | 123/90.15 |
| 6,457,353 B1 | 10/2002 | Kanke et al. | 73/117.3 |
| 6,615,812 B2 | 9/2003 | Wild et al. | 123/683 |
| 7,047,957 B1 | 5/2006 | Smith et al. | 123/673 |
| 7,146,268 B2 | 12/2006 | Wild et al. | 701/107 |
| 2006/0081217 A1 | 4/2006 | Fuwa et al. | 123/350 |

FOREIGN PATENT DOCUMENTS

DE    10039785    2/2002
(Continued)

OTHER PUBLICATIONS

International Search Report and Written Opinion for Application No. PCT/EP2009/051197 (14 pages), May 4, 2009.

(Continued)

*Primary Examiner* — Hai Huynh
(74) *Attorney, Agent, or Firm* — King & Spalding L.L.P.

(57) ABSTRACT

In an internal combustion engine, at a first operating point using no exhaust gas recirculation, a first measured value of a load variable is detected. As a function of a further operating variable, a first model value of the load variable is determined using a suction pipe model. At least one parameter of the suction pipe model is adapted such that the first model value approaches or corresponds to the first measured value. A first value of the parameter adjustment is stored. At a second operating point, using exhaust gas recirculation a second value corresponding to the first value of the parameter adjustment, is determined and stored. The first and second values of the parameter adjustment are compared and a parameter value of an exhaust gas recirculation model is adapted such that the first and the second values of the parameter adjustment approach each other or correspond to each other.

17 Claims, 2 Drawing Sheets

FOREIGN PATENT DOCUMENTS

| | | |
|---|---|---|
| DE | 10158261 | 6/2003 |
| DE | 10158262 A1 | 6/2003 |
| DE | 102004033845 | 2/2006 |
| DE | 102004039216 | 4/2006 |
| EP | 0886725 | 8/1999 |
| EP | 0820559 | 9/1999 |
| WO | 9735106 | 9/1997 |

OTHER PUBLICATIONS

International Search Report and Written Opinion for Application No. PCT/EP2009/051304 (12 pages), Jul. 1, 2009.

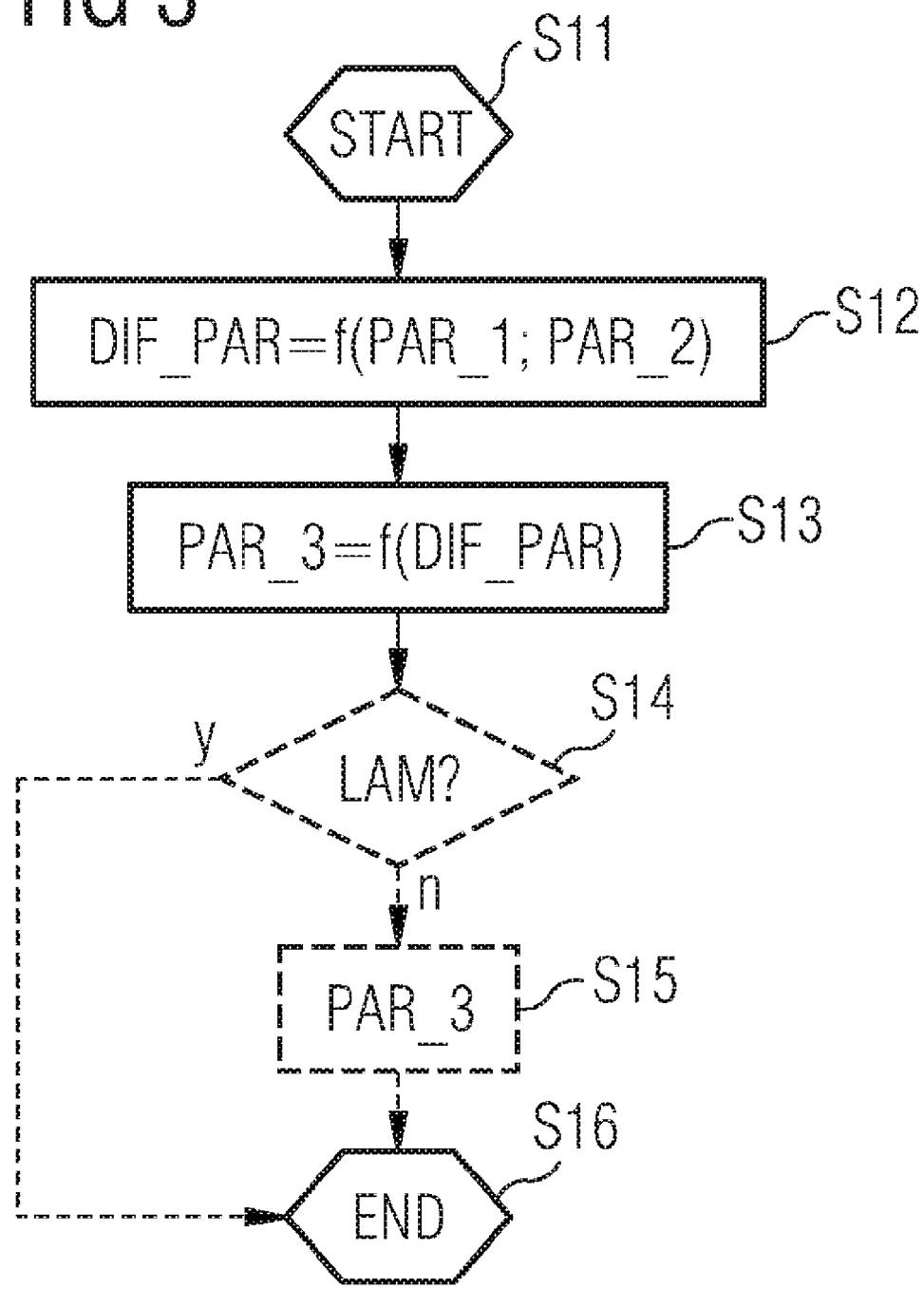

A METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2009/051304 filed Feb. 5, 2009, which designates the United States of America, and claims priority to German Application No. 10 2008 014 069.4 filed Mar. 13, 2008, the contents of which are hereby incorporated by reference in their entirety.

TECHNICAL FIELD

The invention relates to a method and a device for operating an internal combustion engine. A first measured value of a load variable of the internal combustion engine is measured at a first operating point of the internal combustion engine. A first model value of the load variable is determined as a function of the first measured value of a further operating variable by means of a suction pipe model. At least one parameter of the suction pipe model is adapted by means of parameter trimming such that the first model value approaches the first measured value of the load variable or corresponds to the first measured value of the load variable. A first value of the parameter trimming, by means of which the parameter of the suction pipe model at the first operating point of the internal combustion engine is adapted, is stored.

BACKGROUND

Suction pipe models are described, for example, in the patent specifications EP 0 820 559 B1 and EP 0 886 725 B1.

An internal combustion engine is basically designed in such a way that it has a fuel consumption which is as low as possible at a power which is as high as possible and/or a level of pollutant emissions which is as low as possible. For this purpose, it is necessary, for example, to know an air mass flowing into the combustion chamber of a cylinder of the internal combustion engine as accurately as possible. This can be determined by means of a suction pipe model, for example, as a function of a degree of opening of a throttle valve of the internal combustion engine. If the internal combustion engine has an external exhaust gas recirculation pipe by means of which exhaust gas from an exhaust tract of the internal combustion engine can be fed once more to a combustion process in the combustion chamber, then the fresh air mass flowing in via the throttle valve and the recirculated exhaust mass flow into the cylinder. The recirculated exhaust gas mass can, for example, be determined by means of an exhaust gas recirculation model. The exhaust gas recirculation model is similar to the suction pipe model, wherein only the parameters, for example a cross-sectional area of an exhaust gas recirculation valve, are modified, and/or wherein, for example, a degree of opening of the exhaust gas recirculation valve is a typical input variable of the exhaust gas recirculation model.

SUMMARY

According to various embodiments, a method and a device for operating an internal combustion engine can be created which enable an exhaust gas recirculation model to be easily matched to the internal combustion engine.

According to an embodiment, in a method for operating an internal combustion engine, —at a first operating point of the internal combustion engine without exhaust gas recirculation, —a first measured value of a load variable of the internal combustion engine is measured, —a first model value of the load variable is determined as a function of the first measured value of a further operating variable by means of a suction pipe model, —at least one parameter of the suction pipe model is adapted by means of parameter trimming such that the first model value approaches the first measured value of the load variable or corresponds to the first measured value of the load variable, —a first value of the parameter trimming, by means of which the parameter of the suction pipe model at the first operating point of the internal combustion engine without exhaust gas recirculation is adapted, is stored, —at a second operating point of the internal combustion engine with exhaust gas recirculation, —a second measured value of the load variable is measured, —a second model value of the load variable is determined as a function of a second measured value of the further operating variable by means of the suction pipe model, —the parameter of the suction pipe model is adapted by means of parameter trimming such that the second model value approaches the second measured value of the load variable or corresponds to the second measured value of the load variable, —a second value of the parameter trimming, by means of which the parameter of the suction pipe model at the second operating point of the internal combustion engine with exhaust gas recirculation is adapted, is stored, —the first and second stored values of the parameter trimming are compared with one another, —as a function of the comparison, a parameter value of an exhaust gas recirculation model is adapted such that the first and the second values of the parameter trimming approach one another or correspond to one another.

According to a further embodiment, the values of the parameter trimming are only determined and/or compared with one another when at least one specified operating condition of the internal combustion engine is present. According to a further embodiment, the specified operating condition may include stoichiometric operation of the internal combustion engine. According to a further embodiment, —a control of an air/fuel ratio in a combustion chamber of the internal combustion engine is monitored in advance of a combustion process, —an automatic decision as to whether the adaptation of the parameter value of the exhaust gas recirculation model is retained or rejected is made depending on a controller intervention.

According to another embodiment, a device for operating an internal combustion engine, may be designed, —at a first operating point of the internal combustion engine without exhaust gas recirculation, —to measure a first measured value of a load variable of the internal combustion engine, —to determine a first model value of the load variable as a function of a first measured value of a further operating variable of the internal combustion engine by means of a suction pipe model, —to adapt at least one parameter of the suction pipe model by means of parameter trimming such that the first model value approaches the first measured value of the load variable or corresponds to the first measured value of the load variable, —to store a first value of the parameter trimming, by means of which the parameter of the suction pipe model at the first operating point of the internal combustion engine without exhaust gas recirculation is adapted, —at a second operating point of the internal combustion engine with exhaust gas recirculation, —to measure a second measured value of the load variable, —to measure a second model value of the load variable as a function of a second measured value of the further operating variable by means of the suction pipe model, —to adapt the parameter of the suction pipe model by means of parameter trimming such that the second model value approaches the second measured value of the load variable or corresponds to the second measured value of the load variable, —to store a second value of the parameter trimming, by means of which the parameter of the suction pipe model at the second operating point of the internal combustion engine with exhaust gas recirculation is adapted, —to compare the first and second stored values of the parameter trimming with one another, —and to adapt as a function of the comparison a parameter value of an exhaust gas recirculation model such that the first and the second values of the parameter trimming approach one another or correspond to one another.

BRIEF DESCRIPTION OF THE DRAWINGS

Exemplary embodiments are described in more detail below with reference to schematic drawings.

In the drawings:

FIG. 3 shows a flow diagram of a second program for operating the internal combustion engine.

Figure 1:
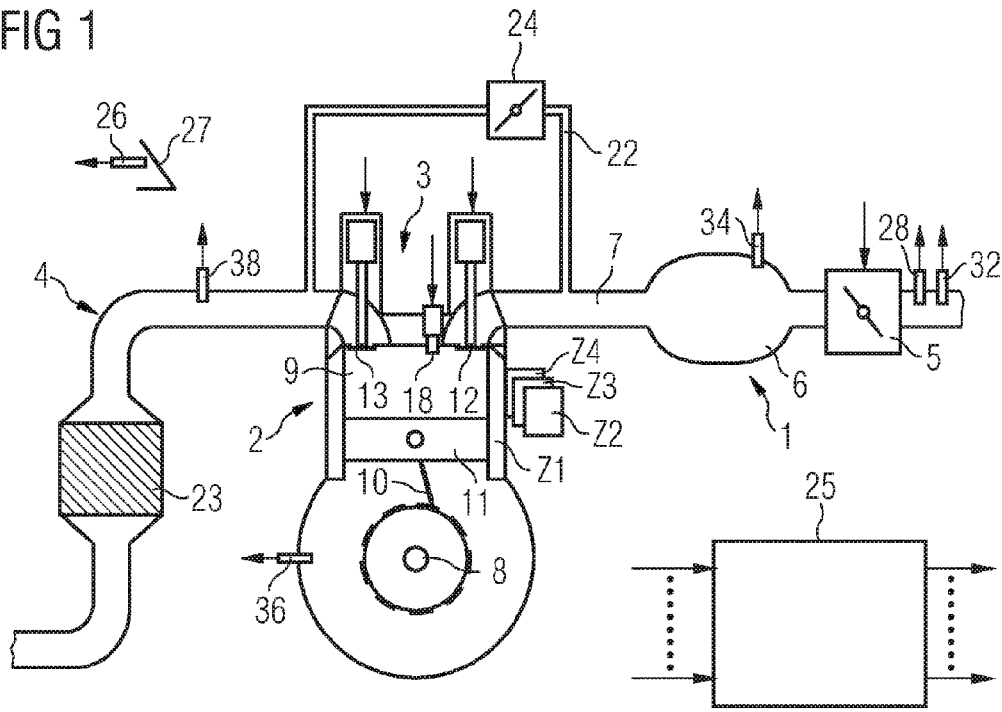
FIG. 1 shows an internal combustion engine.

Elements with the same design or function are identified with the same references in all the figures.

DETAILED DESCRIPTION

According to various embodiment, in a method and a device for operating an internal combustion engine, a first measured value of a load variable of the internal combustion engine is measured at a first operating point of the internal combustion engine without exhaust gas recirculation. A first model value of the load variable is determined as a function of a first measured value of a further operating variable of the internal combustion engine by means of a suction pipe model. At least one parameter of the suction pipe model is adapted by means of parameter trimming such that the first model value approaches the first measured value of the load variable or corresponds to the first measured value of the load variable. A first value of the parameter trimming, by means of which the parameter of the suction pipe model at the first operating point of the internal combustion engine without exhaust gas recirculation is adapted, is stored. A second measured value of the load variable is determined at a second operating point of the internal combustion engine with exhaust gas recirculation. A second model value of the load variable is determined as a function of a second measured value of the further operating variable by means of a suction pipe model. The parameter of the suction pipe model is adapted by means of parameter trimming such that the second model value approaches the second measured value of the load variable or corresponds to the second measured value of the load variable. A second value of the parameter trimming, by means of which the parameter of the suction pipe model at the second operating point of the internal combustion engine with exhaust gas recirculation is adapted, is stored. The first and second stored values of the parameter trimming are compared with one another. As a function of the comparison, a parameter value of an exhaust gas recirculation model of the internal combustion engine is adapted such that the first and the second values of the parameter trimming approach one another or correspond to one another.

This enables the exhaust gas recirculation model to be easily adapted. Advantageously, the adaptation of the exhaust gas recirculation model contributes to an air mass containing a fresh air mass and a recirculated exhaust gas mass flowing into a cylinder of the internal combustion engine being able to be determined particularly precisely. The load variable is a physical variable of the internal combustion engine which with current actuator settings, a current speed of the internal combustion engine and current ambient conditions represents a measure of the torque output by the internal combustion engine, for example an air mass flow via a throttle valve of the internal combustion engine or an air mass flow into a cylinder of the internal combustion engine or a suction pipe pressure in a suction pipe of the internal combustion engine. The further operating variable can basically include any operating variable of the internal combustion engine, as a function of which the first model value of the load variable can be determined. In particular, the further operating variable includes a degree of opening of the throttle valve. The parameter of the suction pipe model can, for example, include a reduced throttle valve area or a pressure upstream of the throttle valve. The exhaust gas recirculation model is similar in its structure to the suction pipe model, wherein an example of an input variable of the exhaust gas recirculation model is a degree of opening of an exhaust gas recirculation valve, an output variable is a recirculated exhaust gas mass, and/or an example of a parameter value of the exhaust gas recirculation model is a reduced exhaust gas recirculation valve area. The first and the second operating point are preferably the same with regard to speed and torque.

When adapting the exhaust gas recirculation model, use is made of the fact that an air mass sensor measures an air mass flow, or a suction pipe pressure sensor measures a suction pipe pressure which occurs as a result of the inflowing fresh air mass or as a result of the inflowing fresh air mass and as a result of the inflowing recirculated exhaust gas mass respectively. The suction pipe model is suitable for determining the inflowing fresh air mass based on at least one further operating variable. To determine the total air mass flowing into the cylinder by means of the suction pipe model, the exhaust gas recirculation model is also required. If the suction pipe model is now precisely adapted to the inflowing air mass in operation without exhaust gas recirculation, then a deviation of the second value of the parameter trimming from the first value of the parameter trimming in operation with exhaust gas recirculation can be attributed to an imprecise determination of the recirculated exhaust gas mass by means of the exhaust gas recirculation model. If the exhaust gas recirculation model is precisely adapted, the first value of the parameter trimming must therefore be the same as the second value of the parameter trimming.

In an embodiment, the values of the parameter trimming are only determined and/or compared with one another when at least one specified operating condition of the internal combustion engine is present. This contributes to the exhaust gas recirculation model being adapted very precisely.

In this regard, it is particularly advantageous when the specified operating condition includes stoichiometric operation of the internal combustion engine. This contributes to the exhaust gas recirculation model being adapted particularly precisely, as in stoichiometric operation a torque of the internal combustion engine is essentially determined by the inflowing fresh air mass.

In a further embodiment, a control of an air/fuel ratio in a combustion chamber of the internal combustion engine is monitored in advance of a combustion process. An automatic decision as to whether the adaptation of the parameter value of the exhaust gas recirculation model is retained or rejected is made depending on a controller intervention. This makes it possible to easily check whether the exhaust gas recirculation model has been correctly adapted. The air/fuel ratio is preferably monitored by means of a lambda controller. If the internal combustion engine is operated in stoichiometric mode, then lambda is equal to 1. Lambda can easily be set to 1 when the fresh air mass flowing into the cylinder, as a function of which a fuel mass to be injected is calculated, is determine precisely. If the fresh air mass flowing into the cylinder is now determined incorrectly, for example due to incorrect adaptation of the parameter value of the exhaust gas recirculation model, then lambda deviates from 1.

An internal combustion engine (FIG. 1) comprises an intake tract 1, an engine block 2, a cylinder head 3 and an exhaust tract 4. The intake tract 1 preferably comprises a throttle valve 5, a manifold 6 and a suction pipe 7 which is fed to a cylinder Z1-Z4 via an inlet channel into a combustion chamber 9 of the engine block 2. The engine block 2 comprises a crankshaft 8 which is coupled to a piston 11 of the cylinder Z1-Z4 by means of a piston rod 10. The inlet tract 1 communicates with the combustion chamber 9 depending on a switching position of the gas inlet valve 12. The exhaust gas tract 4 communicates with the combustion chamber 9 depending on a switching position of the gas outlet valve 13. The internal combustion engine has a plurality of cylinders Z1-Z4. However, the internal combustion engine can also have any number of cylinders Z1-Z4. The internal combustion engine is preferably arranged in a motor vehicle.

A fuel injection valve 18 is preferably arranged in the cylinder head 3. Alternatively, the fuel injection valve 18 can also be arranged in the suction pipe 7. If the internal combustion engine is not a diesel engine, then a sparking plug can also be arranged in the cylinder head 3.

A catalytic converter 23 is preferably arranged in the exhaust gas tract 4. The exhaust gas tract 4 communicates with the intake tract 1 via an exhaust gas recirculation pipe 22 depending on a switching position of an exhaust gas recirculation valve 24. Exhaust gas can be recirculated from the exhaust gas tract 4 into the intake tract 1 through the exhaust gas recirculation pipe 22. In doing so, an external exhaust gas recirculation rate and therefore an exhaust gas mass recirculated into the intake tract 1 can be specified.

A control unit 25 is provided which is associated with sensors which measure the measured values of different measured variables. Operational variables include the measured variables and internal combustion engine variables derived therefrom. Two or more of the operational variables define operating points of the internal combustion engine. As a function of at least one of the operating variables, the control unit 25 determines at least one manipulated variable which is then converted into one or more adjustment signals for controlling the actuators by means of appropriate adjustment drives. The control unit 25 can also be described as a device for operating the internal combustion engine.

Examples of the sensors are a pedal position transducer 26, which measures a driver pedal position of a driver pedal 27; an air mass sensor 28, which measures an air mass flow upstream of an introduction point of the exhaust gas recirculation pipe 22; a temperature sensor 32, which measures an intake air temperature; a suction pipe pressure sensor 34, which measures a suction pipe pressure in the manifold 6; a crankshaft angle sensor 36, which measures a crankshaft angle, with which a speed of the internal combustion engine is then associated; an exhaust gas probe 38, by means of which a residual oxygen content of the exhaust gas, which is representative of an air/fuel ratio in the combustion chamber 9 before a combustion process, can be measured.

Depending on the embodiment, any sub-quantity of the stated sensors can be provided or additional sensors can also be provided.

Examples of actuators are the throttle valve 5, the gas inlet and gas outlet valve 12, 13, the fuel injection valve 18 and/or the exhaust gas recirculation valve 24.

Figure 2:
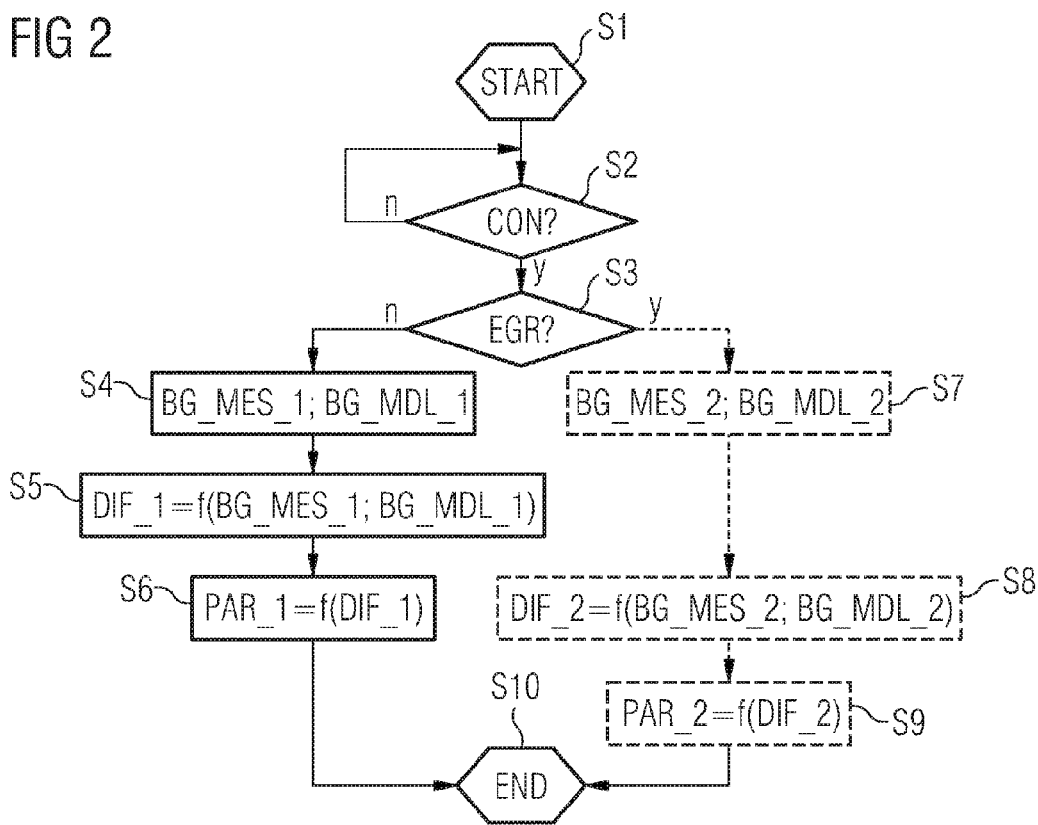
FIG. 2 shows a flow diagram of a first program for operating the internal combustion engine.

A first program for operating the internal combustion engine is preferably stored on a storage medium of the control unit 25 (FIG. 2). The first program is used to adapt at least one parameter of a suction pipe model of the internal combustion engine. The suction pipe model is used to determine a fresh air mass flowing into the cylinder Z1-Z4 as a function, for example, of a degree of opening of the throttle valve 5 and the speed of the internal combustion engine. The values of the parameters of the suction pipe model are initially determined on an engine test rig. As internal combustion engines of the same design are slightly different due to component tolerances and/or wear, and the suction pipe model is determined only on one or more reference engines, adapting the suction pipe model can help to compensate for differences between internal combustion engines of the same design.

Preferably, the first program is started in a step S1 in which variables are initialized if necessary.

In a step S2, a check is preferably carried out as to whether a specified operating condition CON is currently present. The specified operating condition CON can, for example, include stoichiometric operation of the internal combustion engine. In stoichiometric operation, exactly the amount of fresh air mass that enables the measured amount of fuel for the combustion process to just be fully burnt is fed to the combustion process in the combustion chamber 9. Furthermore, in stoichiometric operation, lambda is equal to 1. If the condition of step S2 is fulfilled, the process is continued in a step S3. If the condition of step S2 is not fulfilled, then step S2 is reprocessed.

In step S3, a check is carried out as to whether exhaust gas recirculation EGR is currently carried out. If the condition of step S3 is not fulfilled, the process is continued in a step S4. If the condition of step S3 is fulfilled, the process is continued in a step S7.

A first measured value LOAD_MES_1 of a load variable of the internal combustion engine is measured at a first operating point of the internal combustion engine in step S4. The operating point is given, among other things, by the speed and the current load of the internal combustion engine. An example of the load variable is the air mass flowing into the cylinder or cylinders Z1-Z4. An example of the load variable is the air mass flow or the suction pipe pressure, and the first measured value LOAD_MES_1 of the load variable is preferably measured by means of the air mass sensor 28 or the suction pipe pressure sensor 34 respectively.

Furthermore, a first model value LOAD_MDL_1 of the load variable is determined in the step S4 as a function of a first measured value of a further operating variable, for example as a function of a degree of opening of the throttle valve 5. The first model value LOAD_MDL_1 of the load variable is preferably determined by means of the suction pipe model.

A difference DIF_1 between the first measured value LOAD_MES_1 and the first model value LOAD_MDL_1 of the load variable is determined in a step S5.

A first value PAR_1 of a parameter trimming is determined as a function of the difference DIF_1 between the first measured value LOAD_MES_1 and the first model value LOAD_MDL_1 of the load variable in step S6. The suction pipe model is adapted depending on the first value PAR_1 of the parameter trimming. In particular, a parameter of the suction pipe model is adapted. Examples of the parameter include a pressure upstream of the throttle valve 5 and/or a reduced throttle valve cross-section. The first value PAR_1 of the parameter trimming can be the parameter itself or simply a variable which modifies the appropriate parameter by addition or multiplication.

In the step S7, at a second operating point of the internal combustion engine, which is the same as the first operating point of the internal combustion engine with regard to the speed and the load, a second measured value LOAD_MES_2 and a second model value LOAD_MDL_2 of the load variable are determined in the same way as the first values in step S4.

A difference DIF_2 between the second measured value LOAD_MES_2 and the second model value LOAD_MDL_2 of the load variable is determined in a step S8.

A second value PAR_2 of a parameter trimming is determined as a function of the difference DIF_2 between the second measured value LOAD_MES_2 and the second model value LOAD_MDL_2 of the load variable in a step S9. The second value PAR_2 of the parameter trimming is representative of a measure with which the suction pipe model in operation with exhaust gas recirculation must be adapted so that the second model value LOAD_MDL_2 of the load variable approaches the second measured value LOAD_MES_2 of the load variable or is equal to the second measured value LOAD_MES_2 of the load variable.

The first program can be terminated in a step S10. Preferably however, the first program is processed regularly during operation of the internal combustion engine to adapt the suction pipe model with or without exhaust gas recirculation.

Only the fresh air mass flowing into the cylinder Z1-Z4 is determined by means of the suction pipe model. When the internal combustion engine is operating with external exhaust gas recirculation EGR, an exhaust gas recirculation model is used to determine the recirculated exhaust gas mass flowing into the intake tract 1 as a function of a degree of opening of the exhaust gas recirculation valve 24. If the suction pipe model is now calibrated during operation without exhaust gas recirculation EGR, then the parameter trimming necessary for this must be the same as the parameter trimming for operation with exhaust gas recirculation EGR, assuming that the exhaust gas recirculation model gives precisely the recirculated exhaust gas mass. If the parameter trimming at the same operating point with and without exhaust gas recirculation EGR is not the same, then this must be attributed to an imprecise exhaust gas recirculation model.

A second program for operating the internal combustion engine is preferably stored on the storage medium (FIG. 3). The second program is used to adapt at least one parameter of the exhaust gas recirculation model as a function of the stored values of the parameter trimming of the suction pipe model. An example of the parameter of the exhaust gas recirculation model is the reduced area of the exhaust gas recirculation valve 24.

The second program can be started in a step S11, in which variables are initialized if necessary, for example after processing the first program.

A parameter difference DIF_PAR between the first value PAR_1 and the second value PAR_2 of the parameter trimming is determined in a step S12. This parameter difference DIF_PAR must basically be attributed to an incorrectly determined recirculated exhaust gas mass, as it is assumed that the effects of the differences of the values of the further operating variables which occur at the first and second operating points with and without exhaust gas recirculation respectively are able to be modeled with minimal error.

A parameter value PAR_3 can be determined as a function of the parameter difference DIF_PAR in a step S13. The parameter value PAR_3 is determined such that the second value PAR_2 of the parameter trimming approaches or corresponds to the first value PAR_1 of the parameter trimming. The determination of the parameter value PAR_3 can also be referred to as trimming the exhaust gas recirculation model. The parameter value PAR_3 can be determined, for example, with reference to a characteristic field which can be plotted, for example, on the motor test rig.

After step S13, the second program can be terminated in a step S16. However, the second program can be continued with a checking of the adapted exhaust gas recirculation model in a step S14.

In step S14, a check can be carried out as to whether a control intervention LAM of a lambda controller can be smaller in magnitude as a result of the parameter trimming of the exhaust gas recirculation model. If the parameter value PAR_3 has been determined incorrectly, then this leads to an incorrectly determined recirculated exhaust gas mass and to an incorrectly determined fresh air mass fed to the cylinder Z1-Z4. As the mass of fuel to be injected is determined as a function of the fresh air mass flowing into the cylinder Z1-Z4, the incorrectly determined fresh air mass flowing into the cylinder Z1-Z4 leads to non-stoichiometric combustion which in stoichiometric operation of the internal combustion engine leads to a controller intervention LAM of the lambda controller, which controls lambda to a value of 1 in stoichiometric operation.

If the condition of step S14 is not fulfilled, then the parameter trimming of the exhaust gas recirculation model is rejected and processing is terminated in a step S16. If the condition of step 14 is fulfilled, the process is continued in a step S15.

In step S15, the parameter value PAR_3 is retained until the parameter value is re-determined.

The second program can be terminated in step S16. Preferably however, the second program is processed regularly during operation of the internal combustion engine, in particular at different operating points of the internal combustion engine.

The invention is not restricted to the exemplary embodiments specified. For example, the first and second program can be implemented in one program or be divided into further sub-programs.

What is claimed is:

1. A method for operating an internal combustion engine, comprising:
at a first operating point of the internal combustion engine without exhaust gas recirculation:
measuring a first measured value of a load variable of the internal combustion engine,
determining a first model value of the load variable as a function of the first measured value of a further operating variable by means of a suction pipe model,
adapting at least one parameter of the suction pipe model by means of parameter trimming such that the first model value approaches the first measured value of the load variable or corresponds to the first measured value of the load variable,
storing a first value of the parameter trimming, by means of which the parameter of the suction pipe model at the first operating point of the internal combustion engine without exhaust gas recirculation is adapted, and
at a second operating point of the internal combustion engine with exhaust gas recirculation:
measuring a second measured value of the load variable,
determining a second model value of the load variable as a function of a second measured value of the further operating variable by means of the suction pipe model, adapting the parameter of the suction pipe model by means of parameter trimming such that the second model value approaches the second measured value of the load variable or corresponds to the second measured value of the load variable, storing a second value of the parameter trimming, by means of which the parameter of the suction pipe model at the second operating point of the internal combustion engine with exhaust gas recirculation is adapted, comparing the first and second stored values of the parameter trimming with one another, as a function of the comparison, adapting a parameter value of an exhaust gas recirculation model such that the first and the second values of the parameter trimming approach one another or correspond to one another.

2. The method according to claim 1, wherein the values of the parameter trimming are only at least one of determined and compared with one another when at least one specified operating condition of the internal combustion engine is present.

3. The method according to claim 2, wherein the specified operating condition includes stoichiometric operation of the internal combustion engine.

4. The method according to claim 3, wherein
a control of an air/fuel ratio in a combustion chamber of the internal combustion engine is monitored in advance of a combustion process,
an automatic decision as to whether the adaptation of the parameter value of the exhaust gas recirculation model is retained or rejected is made depending on a controller intervention.

5. A device for operating an internal combustion engine, wherein the device is designed
at a first operating point of the internal combustion engine without exhaust gas recirculation
to measure a first measured value of a load variable of the internal combustion engine,
to determine a first model value of the load variable as a function of a first measured value of a further operating variable of the internal combustion engine by means of a suction pipe model,
to adapt at least one parameter of the suction pipe model by means of parameter trimming such that the first model value approaches the first measured value of the load variable or corresponds to the first measured value of the load variable,
to store a first value of the parameter trimming, by means of which the parameter of the suction pipe model at the first operating point of the internal combustion engine without exhaust gas recirculation is adapted,
at a second operating point of the internal combustion engine with exhaust gas recirculation
to measure a second measured value of the load variable,
to measure a second model value of the load variable as a function of a second measured value of the further operating variable by means of the suction pipe model,
to adapt the parameter of the suction pipe model by means of parameter trimming such that the second model value approaches the second measured value of the load variable or corresponds to the second measured value of the load variable,
to store a second value of the parameter trimming, by means of which the parameter of the suction pipe model at the second operating point of the internal combustion engine with exhaust gas recirculation is adapted,
to compare the first and second stored values of the parameter trimming with one another,
to adapt as a function of the comparison a parameter value of an exhaust gas recirculation model such that the first and the second values of the parameter trimming approach one another or correspond to one another.

6. The device according to claim 5, wherein the values of the parameter trimming are only at least one of determined and compared with one another when at least one specified operating condition of the internal combustion engine is present.

7. The device according to claim 6, wherein the specified operating condition includes stoichiometric operation of the internal combustion engine.

8. The device according to claim 7, wherein
a control of an air/fuel ratio in a combustion chamber of the internal combustion engine is monitored in advance of a combustion process,
an automatic decision as to whether the adaptation of the parameter value of the exhaust gas recirculation model is retained or rejected is made depending on a controller intervention.

9. A system for operating an internal combustion engine, comprising:
an internal combustion engine comprising an intake tract, an engine block, a cylinder head and an exhaust tract communicating with the intake tract via an exhaust gas recirculation pipe depending on a switching position of an exhaust gas recirculation valve, and
a control unit;
wherein at a first switching position of said exhaust gas recirculation valve for operation without exhaust gas recirculation, the control unit is configured:
to measure a first measured value of a load variable of the internal combustion engine,
to determine a first model value of the load variable as a function of the first measured value of a further operating variable by means of a suction pipe model,
to adapt at least one parameter of the suction pipe model by means of parameter trimming such that the first model value approaches the first measured value of the load variable or corresponds to the first measured value of the load variable, and
to store a first value of the parameter trimming, by means of which the parameter of the suction pipe model at the first operating point of the internal combustion engine without exhaust gas recirculation is adapted, and
wherein at a second switching position of said exhaust gas recirculation valve for operation with exhaust gas recirculation, the control unit is configured:
to measure a second measured value of the load variable,
to determine a second model value of the load variable as a function of a second measured value of the further operating variable by means of the suction pipe model,
to adapt the parameter of the suction pipe model by means of parameter trimming such that the second model value approaches the second measured value of the load variable or corresponds to the second measured value of the load variable,
to store a second value of the parameter trimming, by means of which the parameter of the suction pipe model at the second operating point of the internal combustion engine with exhaust gas recirculation is adapted,
to compare the first and second stored values of the parameter trimming with one another,
and as a function of the comparison, to adapt a parameter value of an exhaust gas recirculation model such that the first and the second values of the parameter trimming approach one another or correspond to one another.

10. The system according to claim 9, wherein the values of the parameter trimming are only at least one of determined and compared with one another when at least one specified operating condition of the internal combustion engine is present.

11. The system according to claim 10, wherein the specified operating condition includes stoichiometric operation of the internal combustion engine.

12. The system according to claim 11, wherein
- a control of an air/fuel ratio in a combustion chamber of the internal combustion engine is monitored in advance of a combustion process,
- an automatic decision as to whether the adaptation of the parameter value of the exhaust gas recirculation model is retained or rejected is made depending on a controller intervention.

13. The system according to claim 9, wherein the intake tract comprises a throttle valve 5, a manifold and a suction pipe which is fed to a cylinder via an inlet channel into a combustion chamber of the engine block.

14. The system according to claim 9, wherein the engine block comprises a crankshaft which is coupled to a piston of the cylinder by means of a piston rod.

15. The system according to claim 9, wherein the inlet tract communicates with the combustion chamber depending on a switching position of a gas inlet valve.

16. The system according to claim 9, wherein the exhaust gas tract communicates with the combustion chamber depending on a switching position of a gas outlet valve.

17. The system according to claim 9, wherein the internal combustion engine has a plurality of cylinders.

* * * * *